June 17, 1941.  A. PALME ET AL  2,246,182
APPARATUS FOR TRANSFORMER TAP CHANGING UNDER LOAD
Filed March 29, 1940
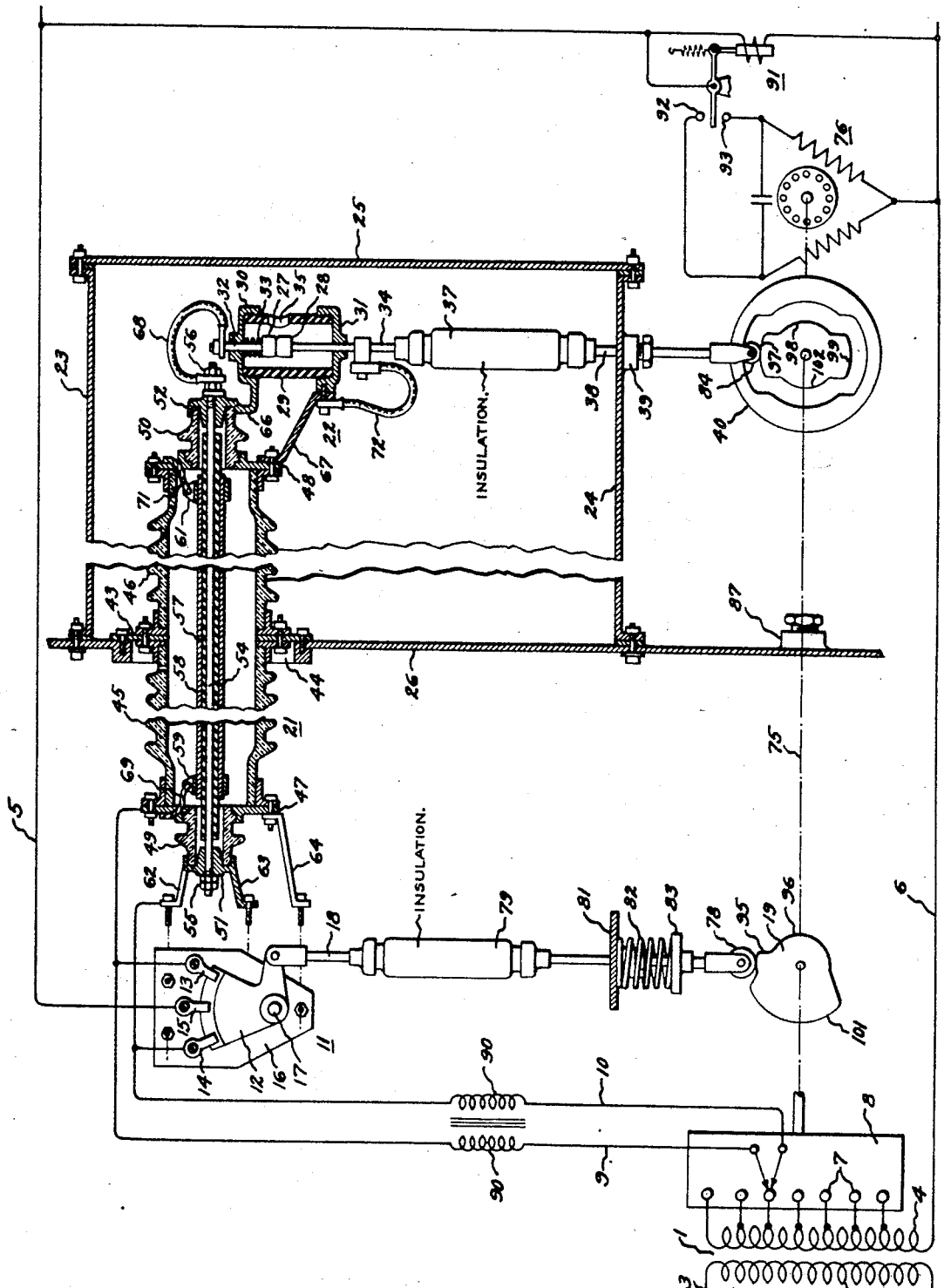
Inventors:
Arthur Palme,
Orin P. McCarty,
by Harry E. Dunham
Their Attorney.

Patented June 17, 1941

2,246,182

UNITED STATES PATENT OFFICE 2,246,182

APPARATUS FOR TRANSFORMER TAP CHANGING UNDER LOAD

Arthur Palme and Orin P. McCarty, Pittsfield, Mass., assignors to General Electric Company, a corporation of New York Application March 29, 1940, Serial No. 326,733

7 Claims. (Cl. 171—119)

This invention relates to transformer tap changing apparatus and is in the nature of an improvement over that shown in Patent No. 2,112,064, Blume, which patent is assigned to the General Electric Company, the assignee of the present application.

The tap changer disclosed in the above patent is particularly adaptable for changing the transformer taps under load in heavy duty circuits. The transformer current is initially divided between two branch conductors which are each connected to the same tap on one of the transformer windings. A selector switch is provided for connecting a power circuit to either one or both of the branch conductors. In a tap changing operation the selector switch is adjusted so that the power circuit is connected to the transformer through just one of the branch conductors, and the circuit through the second branch conductor is interrupted by an arcing contactor. The tap change is then made by the transformer ratio adjuster which connects the second branch conductor to the next tap. The contactor is then closed after which the selector switch is shifted to connect the power circuit to the second branch conductor. The arcing contactor is then opened again to open circuit the first branch conductor which is then connected by the ratio adjuster to the same tap as is connected to the second branch conductor. The arcing contactor is then reclosed and the selector switch is shifted to connect both branch conductors to the power circuit. In this manner connections are changed in a step-by-step manner along a row of transformer tap contacts without at any time breaking the main circuit.

While the greater amount of arcing takes place at the arcing contactor, a certain amount of arcing also takes place at the contacts of the selector switch, due to the reactive impedance drop of the loop circuit including the closed arcing contactor. Because of this fact it is necessary to arrange both the selector switch and the arcing contactor exteriorly of the transformer tank proper. As is well understood, any arcing taking place within the oil filled transformer tank causes a contamination or sludging of the oil resulting in a serious impairment of its insulation characteristics. To mount both the selector switch and arcing contactor outside of the transformer tank necessitates the provision of a plurality of bushings in addition to the regular number through the wall of the transformer tank, which bushings because of the high voltages involved are large and expensive.

It is therefore an object of this invention to provide a new and improved tap changing arrangement in which arcing at the contacts of the selector switch is substantially eliminated so that this element of the apparatus may safely be arranged within the main oil filled transformer tank.

For a consideration of what we believe to be novel and our invention, attention is directed to the following description and the claims appended thereto taken in connection with the accompanying drawing.

Referring now to the single figure of the accompanying drawing, we have shown therein diagrammatically an embodiment of our invention as applied to a power transformer 1. As shown, this transformer has a primary winding 2 connected to a supply circuit 3 and a secondary winding 4 connected to a load circuit indicated by conductors 5 and 6. The winding 4 is provided with a plurality of tap contacts 7. A suitable twin ratio adjuster 8 of any well known construction is arranged to make selective connections between tap contacts 7 and a pair of branch circuit conductors 9 and 10. The mechanical details of one such ratio adjuster are shown in Patent No. 1,588,204, issued June 8, 1926, on an application of H. O. Stephens et al. and assigned to the assignee of the present application. The branch conductors 9 and 10 are arranged for selective simultaneous or individual connection to the load circuit conductor 5 by means of a main current carrying selector switch 11 arranged within the transformer tank. This switch is substantially a non-current interrupting disconnecting switch and is shown by way of example as consisting of a segmental contact member 12 which in the position shown bridges the fixed contacts 13 and 14 connected to the branch conductors 9 and 10, respectively, and an intermediate fixed contact 15 connected to the load circuit conductor 5. The contacts 13, 14, and 15 are fixed upon an insulating base plate 16 and the segmental contact member is pivotally mounted at 17 thereon. The segmental contact member 11 is operated through stem 18 by a cam 19.

The selector switch is mounted upon the left end of a bushing 21 which extends into the transformer tank. The right end of the bushing extending outside of the transformer tank supports an arcing contactor indicated generally at 22. A boxlike compartment defined in part by upper and lower walls 23 and 24, respectively, and an end wall 25 is secured to the side wall 26 of the transformer tank enclosing the right end of the bushing 21 and the contactor 22. This compartment is sealed from the interior of the main transformer tank and is normally filled with oil which may be poured into the compartment through any suitably arranged inlet (not shown).

The contactor 22 may be of any suitable type and as shown comprises a pair of contacts 27 and 28 arranged for axial movement within a surrounding arcing chamber defined by a cylindrical member 29 of insulating material and metal end caps 30 and 31. The upper contact 27 is carried by a stem 32 extending through cap 30 and is biased downwardly by spring 33. The lower contact 28 is carried by stem 34 extending through the lower cap 31. The cylinder 29 is provided with an opening 35 through which oil may flow into and out of the arcing chamber. An insulator 37 connects the stem 34 with a second stem portion 38 extending through bushing 39 in the wall 24. The contact 28 is actuated through stem 34—38 by a closed cam generally indicated at 40.

The contacts 27 and 28 of the arcing contactor are connected across the branch conductors by a series loop conductor arrangement having negligible reactive impedance extending through the bushing 21. The bushing is substantially symmetrical on opposite sides of the central metal flange ring 43 by which the bushing is secured to the periphery of the opening 44 through the tank wall 26. The bushing further includes a pair of cylindrical insulator portions 45 and 46 with metal collars 47 and 48 having axial openings therethrough arranged over the outer ends of the insulator portions 45 and 46, respectively. Smaller cylindrical insulators 49 and 50 are suitably flanged for cooperatively fitting into the axial openings in the collars 47 and 48, while the outer ends thereof are covered with metal cap pieces 51 and 52, respectively. The bushing assembly described is clamped together by means of an axially extending conductor rod 54 which is threaded at its opposite end for cooperatively receiving the nuts 55 and 56. The conductor rod 54 extending axially through the bushing assembly is provided with the sleeve 57 of insulating material and around which is arranged a second conductor concentric with the conductor 54 which comprises a metal sleeve 58 having terminals 59 and 61 at the opposite ends thereof. The selector switch is attached to the left end of the bushing, the base 16 of the selector switch being suitably secured to the arms 62 and 63 integral with the bushing end cap 51 and also to an arm 64 extending from the bushing collar 47. The contactor 22 is mounted upon the right end of the bushing, the upper cap 30 of the arcing chamber being secured to the bushing end cap 52 through the integral arm 66 while the lower cap 31 is secured to the bushing collar 48 through the arm 67.

The circuit through the bushing for the arcing contactor 22 may be traced from the branch conductor 10 through the left end cap of the bushing, through the central conductor rod 54, the flexible lead 68 to the stem 32 of the upper contact member 27. The branch conductor 9 is connected to the lower contact element 28 of the contactor 22 by a circuit including the bushing collar 47, lead 69, terminal 59, the outer concentric cylinder 58, the terminal 61, lead 71, the bushing collar 48, arm 67, flexible lead 72 and stem 34 to the lower contact 28.

The ratio adjuster 8 and the cams 19 and 40 are coupled together mechanically so that they all may be driven by a common operating means. As shown, they are all coupled together by a shaft 75 driven by a motor 76. The cam 19 is engaged by a roller 78 arranged on the lower end of the operating stem 18 for the selector switch 11. An electrical insulator 79 is arranged in the operating stem 18, and the lower end of the stem is guided by a suitable bearing provided in a stationary part 81 which may be suitably secured to the transformer tank. The roller 78 is maintained in engagement with the cam surface by means of a spring 82 arranged between the stationary part 81 and a stop 83 provided on the stem. The cam 40 for operating the arcing contactor 22 is of a closed or grooved type in which the roller 84 secured to the lower end of the operating stem 38 rides between the inner and outer surfaces. With this type of cam the contacts of the arcing contactor may be positively separated in the event they are welded together upon heavy arcing. It will be noted that the cam 40 is arranged exteriorly of the transformer tank, while the other cam 19 may be arranged inside of the tank, the shaft 75 passing through the tank wall at the bushing 87.

Connected in series with the branch conductors 9 and 10 are the halves 90 of a preventive reactor. Such devices are well known and serve to limit the circulating current through the branch conductors at the times when they are connected to different voltage tap contacts. When the branch conductors are connected to the same tap contacts, the current in the two halves 90 of the reactor neutralize each other electromagnetically and no current limiting reactance is set up in the circuit.

By way of example we have shown our invention as applied to an automatic voltage regulating system. The control element is a conventional contact making voltmeter 91 connected to respond to the voltage of the load circuit 5, 6. It has a set of "raise" contacts 92 which close when the load circuit voltage is below a predetermined normal value and a set of "lower" contacts 93 which close when the circuit voltage is above the predetermined value. These "raise" and "lower" contacts 92 and 93 control reversing circuits for the motor 76 which is shown by way of example as a conventional reversible capacitor motor, such as is commonly used for driving the tap changing mechanism of regulating transformers. Ordinarily, of course, auxiliary relays are interposed between the contact making voltmeter contacts and the motor circuit, but for the sake of simplicity they have been omitted from the drawing.

The operation of the illustrated embodiment of our invention is as follows:

Initially, all of the transformer load current divides equally between the branch conductors 9 and 10, which as shown are both connected to the same tap contacts by the ratio adjuster 8. Substantially all of this current will flow through the switch 11 which is designed to carry all of this current. Assume that for some reason the voltage of the load circuit 5, 6 falls sufficiently below normal to cause the engagement of the "raise" contacts 92. This completes a circuit for operating the motor 76. Assume that the motor 76 rotates in such a direction that the cams 19 and 40 turn in a counterclockwise direction as viewed in the drawing. As the shaft 75 begins to rotate in a counterclockwise direction, the roller 78 will first drop from the surface 95 onto a lower surface 96 of cam 19 resulting in movement of the contact 12 of switch 11 so that it bridges only the fixed contacts 13 and 15. The current in the branch conductor 10 is not interrupted but continues to flow through the loop circuit bridging the fixed contacts 13 and 14 and comprising the concentric conductors 54 and 58 of the bushing and the current interrupting contactor 22. Shortly after the contact 12 of the switch 11 leaves the fixed contact 14, the roller 84 will drop off of the surface 97 of the cam 40 onto the lower surface 98, thereby separating the contacts 27 and 28 of the arcing contactor 22. The current flow through the branch conductor 10 is thereby interrupted and all of the transformer current will now be carried through the branch conductor 9. The branch conductor 10 can then be connected to the next lowermost tap, as viewed in the drawing, by means of the ratio adjuster 8. Shortly after this tap change has been effected, the roller 84 will be lifted up onto the surface 99 of the cam 40, thereby reclosing the arcing contactor 22, completing a current carrying circuit through the branch conductor 10, the contactor 22, the fixed contact 13 of the selector switch 11 to the common contact 15. Soon after the closure of the contactor 22, the roller 78 will rise upwardly onto the surface 101 of the cam 19 to shift the contact 12 of the selector switch 11 so that it bridges the fixed contacts 14 and 15 and disengages the fixed contact 13. Soon after this shift of the selector switch 11, the roller 84 will drop from the surface 99 onto the lower surface 102 of the cam 40 to open the contactor 22 and interrupt the current flow through the branch conductor 9. The branch conductor 9 may now be connected to the next lowermost tap contact, with which the branch conductor 10 is connected, by operation of the ratio adjuster. After this tap change has been completed, the roller 84 will rise up onto the surface 97 of the cam 40 to reclose the arcing contactor 22, completing a current carrying circuit through the branch conductor 9 and fixed contact 14 of the selector switch 11 to the common contact 15. Further rotation of the motor will result in the movement of the roller 78 onto the surface 95 of the cam 19 and movement of the segment 12 of the selector switch 11 to the position shown in which it connects both the fixed contacts 13 and 14 to the common contact 15.

The voltage of the load circuit will now have been raised by an amount corresponding to the voltage between the tap contacts of the transformer and if this is sufficient to restore the voltage to normal, the contact making voltmeter will break the motor circuit through its "raise" contact 92. If not, the motor 76 will continue rotating and the cams will progress through another cycle of operation as described to connect the branch conductors 9 and 10 to a still lower tap of the transformer winding until the voltage has been raised to the value at which the contact making voltmeter 91 balances.

If the voltage of the load circuit 5, 6 is too high, the "lower" contact 93 of the contact making voltmeter 91 will close, thereby reversing the direction of the motor 76. This will not reverse the sequence of operation of the selector switch 11 and the contactor 22 but merely reverses the direction of the tap changing by the ratio adjuster. Thus instead of connecting the branch conductors 9 and 10 successively to lower tap contacts, the reversal of direction of rotation of the motor 76 causes the ratio adjuster to make successive connections in a step-by-step manner along the upper tap contacts 7, thus lowering the voltage of the load circuit 5, 6. It is to be understood, however, that before each tap change with respect to one of the branch conductors, the circuit through it is first broken by the selector switch 11 and then the current in it is interrupted by the contactor 22 before the tap change is made. This operation continues until the voltage is restored to normal whereupon the contact making voltmeter 91 balances.

By the arrangement described no arcing will take place at the fixed contacts 13 and 14 of the selector switch 11 during the operation thereof due to the fact that the loop circuit to the arcing contactor 22 bridging the fixed contacts possesses substantially no reactive impedance. The magnetic fields produced by current flowing through the concentric conductors 54 and 58 of the bushing 21 substantially neutralize each other so that the resultant field and hence the inductance thereof is zero. By making all current carrying parts of this loop circuit of very low resistance the total impedance of the loop circuit is reduced to a negligibly low value. Under these conditions there will be substantially no impedance drop in the closed loop circuit and arcing at the contacts of the selector switch 11 is substantially eliminated so that the selector switch may be safely mounted within the transformer tank proper. Since the arcing contactor 22 is arranged within its own individual oil filled compartment, the transformer oil will not deteriorate as a result of the switching operations.

Having described the principle of operation of our invention together with the apparatus which we now consider to represent the best embodiment thereof, we desire to have it understood that the apparatus shown is merely illustrative and that the invention may be carried out by other means.

What we claim as new and desire to secure by Letters Patent of the United States, is:

1. In combination, a power circuit, a transformer comprising a housing, a winding having a plurality of taps, a ratio adjuster in said housing for selectively connecting a pair of conductors to said taps, a non-current interrupting selector switch in said housing for selectively connecting either one or both of said conductors to said power circuit, a current interrupting contactor for interrupting the current in whichever conductor has been disconnected from said circuit by said selector switch, an enclosure for said contactor, an insulating bushing extending through a wall of said transformer housing into said enclosure, and a pair of concentrically arranged conductors extending through said bushing for connecting said contactor to said first pair of conductors.

2. In a circuit for transformer tap changing under load, a power circuit, a transformer winding provided with a plurality of taps, a ratio adjuster for selectively connecting a pair of conductors to said taps, main current carrying selector switching means for connecting both of said conductors to said power circuit and for selectively disconnecting either one of said conductors from said circuit, a current interrupting arcing contactor for maintaining a current conducting path between said circuit and the conductor disconnected therefrom by said switching means until after said switching means opens, and a loop circuit comprising a pair of concentric conductors connecting said arcing contactor to said first pair of conductors.

3. In a circuit for transformer tap changing under load, a transformer winding provided with a plurality of taps, a ratio adjuster for selectively connecting a pair of conductors to said taps, a switch having two fixed contacts and a movable contact, said fixed contacts being connected respectively to said conductors, said movable contact being arranged selectively to engage both or either of said fixed contacts, a contactor, means connecting said contactor across said fixed contacts, said switch and said contactor being so correlated that said contactor is opened only when the movable contact of the switch is engaging but one of the fixed contacts, said connecting means between said switch and said contactor comprising a pair of conductors so arranged as to have negligible resultant reactance whereby substantially no arcing takes place at said switch when it is operated with said contactor closed.

4. In a circuit for transformer tap changing under load, the combination comprising a power circuit, a transformer including a winding and an enclosing tank containing an insulating liquid, a switch in said tank for connecting a lead of said transformer winding to said circuit, an arcing contactor arranged outside of said tank and connected across contacts of said switch, said switch being adapted to be operated only when said arcing contactor is closed, the connection between said switch and said contactor comprising a loop conductor circuit having negligible reactance whereby substantially no arcing takes place at said switch when said switch is operated.

5. In combination, a tank containing an insulating liquid, a transformer in said tank having a winding provided with a plurality of taps, a switch arranged in the liquid in said tank and having a pair of contacts normally connected to said taps, an arcing contactor arranged outside of said tank and connected across said contacts, said switch being adapted to be operated only when said contactor is closed, the connection between said switch and said contactor comprising a loop conductor circuit having negligible resultant impedance.

6. In combination, a tank containing an insulating liquid, a transformer in said tank having a winding provided with a plurality of taps, a bushing arranged through a wall of said tank, a switch arranged on the end of said bushing on the interior of said tank and having a pair of contacts normally connected to said taps, an arcing contactor arranged on the end of said bushing outside of said tank, means for sequentially operating said switch and said contactor whereby said switch is operated only when said contactor is closed, said contactor being connected across said switch contacts by a loop circuit including a pair of concentric conductors extending axially through said bushing.

7. In combination, a tank containing an insulating liquid, a transformer in said tank having a winding provided with a plurality of taps, a bushing extending through a wall of said tank, a switch arranged in said tank adjacent the inner end of said bushing, said switch having a pair of fixed contacts normally connected to said taps, an arcing contactor arranged outside of said tank adjacent the outer end of said bushing, a loop circuit connecting said contactor across said pair of fixed contacts comprising a pair of concentric conductors extending through said bushing, an oil filled enclosure for said contactor, and means for operating said switch and said contactor whereby said switch may be operated only while said contactor is closed.

ARTHUR PALME.
ORIN P McCARTY.